US012412285B2

(12) United States Patent
Lee et al.

(10) Patent No.: US 12,412,285 B2
(45) Date of Patent: Sep. 9, 2025

(54) SYSTEM AND METHOD FOR MEASURING LOCATION OF MOVING OBJECT BASED ON ARTIFICIAL INTELLIGENCE

(71) Applicant: NEOWINE Co., Ltd., Seongnam-si (KR)

(72) Inventors: Hyo Seung Lee, Seongnam-si (KR); Choon Ho Kim, Seongnam-si (KR); Seen Suk Kang, Seongnam-si (KR)

(73) Assignee: NEOWINE Co., Ltd., Seongnam-si (KR)

( * ) Notice: Subject to any disclaimer, the term of this patent is extended or adjusted under 35 U.S.C. 154(b) by 92 days.

(21) Appl. No.: 18/077,303

(22) Filed: Dec. 8, 2022

(65) Prior Publication Data

US 2023/0186493 A1 Jun. 15, 2023

(30) Foreign Application Priority Data

Dec. 9, 2021 (KR) ........................ 10-2021-0175994

(51) Int. Cl.
*G06T 7/292* (2017.01)
*A63B 71/06* (2006.01)
(Continued)

(52) U.S. Cl.
CPC .......... *G06T 7/292* (2017.01); *A63B 71/0622* (2013.01); *G06T 7/70* (2017.01); *H04N 23/61* (2023.01); *H04N 23/69* (2023.01); *A63B 2220/05* (2013.01); *A63B 2220/20* (2013.01); *A63B 2220/807* (2013.01); *G06T 2207/10028* (2013.01); *G06T 2207/30224* (2013.01); *G06T 2207/30241* (2013.01); *H04N 23/90* (2023.01)

(58) Field of Classification Search
CPC ................................ G06T 7/292; H04N 23/61
See application file for complete search history.

(56) References Cited

U.S. PATENT DOCUMENTS 6,520,864 B1 * 2/2003 Wilk ...................... A63B 57/00 473/407
8,613,620 B2 * 12/2013 Barasch ............. G09B 19/0038 434/257
(Continued)

FOREIGN PATENT DOCUMENTS

KR 10-2016-0122383 A 10/2016

*Primary Examiner* — Irfan Habib
(74) *Attorney, Agent, or Firm* — Harvest IP Law LLP

(57) ABSTRACT

A system and method for measuring the position of a moving object based on AI, which provides location and distance information of a moving object to a user using artificial intelligence-based image analysis and distance measurement. Accordingly, the system for measuring the position of an AI-based moving object includes a first camera that captures a first object, a second camera installed around the location where the first object has moved and captures the first object and a second object associated with the first object, and a rangefinder for measuring a first distance between the first object and a distance measurement reference position and a second distance between the second object and a distance measurement reference position; and an object monitoring device that calculates a position value of the first object and a position value of the second object using the first and the second distances measured by the rangefinder.

9 Claims, 7 Drawing Sheets

(51) Int. Cl.
*G06T 7/70* (2017.01)
*H04N 23/61* (2023.01)
*H04N 23/69* (2023.01)
*H04N 23/90* (2023.01)

(56) References Cited

U.S. PATENT DOCUMENTS 9,694,267 B1* 7/2017 Thornbrue ......... A63B 69/0002
9,761,011 B2* 9/2017 Utsunomiya ........... G06T 7/251
11,328,161 B2* 5/2022 Martin ................. G06V 40/172
11,900,616 B2* 2/2024 Qian .................... H04N 23/695
11,994,377 B2* 5/2024 Holz .................. G01B 11/2433
12,186,643 B2* 1/2025 Tuxen .................... G06V 20/42
2004/0017473 A1* 1/2004 Marks ................... G06F 3/0304 348/207.1
2005/0012023 A1* 1/2005 Vock ..................... G01S 3/7864 250/206.1
2010/0020068 A1* 1/2010 House ..................... G06T 15/10 345/419
2010/0210377 A1* 8/2010 Lock .................. A63B 69/3658 473/409
2011/0205077 A1* 8/2011 Cavallaro ............... G01S 17/14 340/686.6
2011/0273562 A1* 11/2011 Dawe ................. A63B 69/3658 348/139
2012/0143808 A1* 6/2012 Karins ..................... G06N 7/01 706/46
2013/0128050 A1* 5/2013 Aghdasi .................. G06T 7/292 348/158
2015/0006639 A1* 1/2015 Huston ................... H04L 51/52 709/204
2015/0269435 A1* 9/2015 Bentley ................ A61B 5/1121 348/157
2016/0260250 A1* 9/2016 Jovanovic ............ H04N 13/246
2017/0001118 A1* 1/2017 Ibrahim ........... H04N 21/23418
2017/0272703 A1* 9/2017 Allen ..................... H04N 7/183
2018/0156914 A1* 6/2018 Tuxen ........................ G01S 7/02
2019/0050995 A1* 2/2019 Tasaki ..................... G06T 7/215
2019/0134506 A1* 5/2019 Gupta ................ G09B 19/0038
2019/0287260 A1* 9/2019 Kataoka ................. G06V 20/58
2020/0064119 A1* 2/2020 Gordon ..................... G06T 7/73
2020/0167950 A1* 5/2020 Kaneko ................... G06T 7/215
2021/0089761 A1* 3/2021 Tyomkin ................ G06V 40/23
2021/0233326 A1* 7/2021 Li ............................. G06T 7/74
2022/0254164 A1* 8/2022 Sakai ........................ G06T 7/20
2022/0301351 A1* 9/2022 Zhao .................... G06V 10/454
2022/0383636 A1* 12/2022 Imes ...................... G06V 20/42
2022/0400202 A1* 12/2022 Imes ........................ H04N 5/77
2023/0100572 A1* 3/2023 Jayaram .................. G06T 19/00 345/419
2023/0347209 A1* 11/2023 Oh ......................... G01B 11/00
2023/0381625 A1* 11/2023 Imes ...................... G06V 20/49
2023/0394682 A1* 12/2023 Yamamoto ............. G06V 20/58
2024/0135556 A1* 4/2024 Yoon ....................... G06T 7/292
2024/0233387 A1* 7/2024 Sriram ................. G06V 10/764
2024/0425042 A1* 12/2024 Yu ............................ G08G 1/16
2025/0014346 A1* 1/2025 Jeong ..................... G06Q 50/40
2025/0037482 A1* 1/2025 Siekmann .............. G06V 40/10
2025/0095167 A1* 3/2025 Tang ...................... G06V 20/52
2025/0166385 A1* 5/2025 Gabay ....................... G06T 7/73
2025/0182488 A1* 6/2025 An ......................... G06V 20/52

* cited by examiner

SYSTEM AND METHOD FOR MEASURING LOCATION OF MOVING OBJECT BASED ON ARTIFICIAL INTELLIGENCE

CROSS REFERENCE TO RELATED APPLICATION

The present application claims the benefit of Korean Patent Application No. 10-2021-0175994 filed on Dec. 9, 2021.

TECHNICAL FIELD

The present invention relates to a system and method for measuring the position of an artificial function-based moving object that provides location and distance information of a moving object to a user using artificial intelligence-based image analysis and distance measurement.

BACKGROUND

The golf course is divided into areas such as teeing ground, fairway, rough, bunker, hazard, OB (Out of Bounds), and green.

In general, the most important piece of information in golf is the distance between the golf ball and the hole on the green. On the golf course, almost every position except the hole is fixed. The position of the hall changes 1-2 times a day. When playing golf, the distance between the golf ball and the hole changes in real time, so it must be measured continuously.

Various techniques for measuring the distance between a golf ball and a golf hole have been proposed.

The first method is for the player to carry a GPS-mounted device to measure the distance between the golf ball and the golf hole. However, this measurement method has a problem that the player must go to the location where the golf ball is located to measure the distance between the golf ball and the golf hole. Also, since the location of the hole changes every day, the value of the middle location of the green should be estimated and used as the location of the hole. Therefore, this measurement method usually generates an error of about 10 to 20 m.

The second method is to measure using a laser rangefinder. However, even in this measurement method, the distance between the golf ball and the golf hole can be measured only when the player goes to the position where the golf ball is located. Moreover, if the distance from the position of the golf ball to the golf hole is long, there is a problem in that measurement itself is difficult.

A third method is to measure the position and distance of the golf ball by inserting an RFID antenna into the golf ball. However, this measurement method has the disadvantage that the price of the golf ball is high, and there is an inevitable limit to the function of the golf ball because the part is included in the center of the ball. In other words, when rotation is applied in putting and shooting, a serious problem occurs in the direction of the ball.

The fourth method is to measure using image analysis. This measurement method analyzes the swing form of the image and the moving trajectory of the golf ball to calculate the flight distance of the golf ball. However, since this measurement method calculates the flight distance of the golf ball, it is difficult to accurately measure the distance between the golf ball and the golf hole because the drop position of the golf ball cannot be accurately determined.

CITED REFERENCE

Patent Document

Patent Document 1: Korea Laid-Open Patent Publication No. 10-2016-0122383

EMBODIMENTS OF THE INVENTION

Problems to Be Solved

The present invention has been devised to solve the above problems, and an object of the present invention is to enable a player to find out the distance between a golf ball and a hole in real time even if the player does not go to the location where the golf ball is located after hitting the golf ball.

Another object of the present invention is to allow each player to check the distance between his or her ball and the ball of another player even if he does not go to the point where the ball fell when multiple players play golf.

It is another object of the present invention to enable the player to cope with the next play by finding out in advance the surrounding environment of the position where the golf ball is located even if the player does not go to the position where the golf ball has fallen.

Means for Solving the Problems

To solve the above problem mentioned above, a position measurement system of the artificial intelligence-based moving object according to the present invention may include: a first camera configured to photograph a first object; a second camera configured to install around a position where the first object has moved and photographs the first object and a second object associated with the first object; and a rangefinder configured to measure a first distance between the first object and a distance measurement reference location and a second distance between the second object and a distance measurement reference location, and a position value of the first object and a position value of the second object using the first distance and the second distance measured by the rangefinder.

A system for measuring the position of a moving object based on artificial intelligence according to the present invention may include a first camera device for calculating a distance moved by a first object by tracking a movement trajectory of a first object from an image obtained by photographing a first object; a second camera device installed around a position where the first object moves to photograph the first object and a second object associated with the first object to measure a first distance between the first object and a distance measurement reference position and a second distance between the second object and the distance measurement reference position; and an object monitoring device for producing the place value of the first object and place value of the second object by using the first distance and the second distance received a message from the second camera device.

The method for measuring a distance of a moving object based on artificial intelligence according to the present invention may include steps of: analyzing an image photographed by a first camera to track a moving trajectory of the first object and calculating a moving distance of the first object based on the moving trajectory of the first object; a step of recognizing the first object by analyzing an image photographed by a second camera installed around a location where the first object moves based on a moving distance of the first object; a step of moving and zooming in the second camera to locate the first object at a specific point of an image, and receiving a first distance between the first object and a distance meter measured from the second camera or a rangefinder installed around the second camera; a step of recognizing a second object related to the first object by analyzing an image photographed by the second camera; a step of positioning the second object at a specific point of the image by moving and zooming the second camera, and receiving a second distance between the second object and the distance meter measured by the distance meter, for example, a laser rangefinder; and step of calculating a place value of the first object and a place value of the second object based upon the first distance and the second distance.

Effects of the Invention

As described above, aspect(s) of the present invention has an effect of recognizing the location of the golf ball and the distance between the golf ball and the hole in real time through the user terminal even if the player does not go to the location where the golf ball is located after hitting the golf ball. In addition, aspect(s) of the present invention has an effect that when several players play golf, each player can check the position of another player's ball and the distance between their own ball and the other player's ball, even if they do not go to the point where the ball fell.

In addition, since aspects of the present invention may allow the player to view the surrounding image of the location where the ball fell through the user terminal after hitting the ball, even if the player does not go to the location where the golf ball fell, there is an effect of coping with the next play by immediately recognizing the surrounding environment where the golf ball is located.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED EMBODIMENTS OF THE INVENTION

Figure 1:
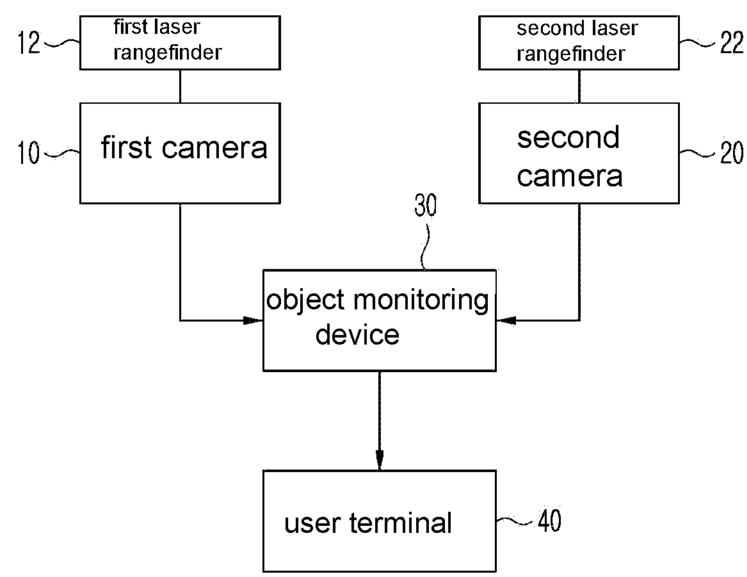
FIG. 1 is a schematic configuration diagram of an artificial intelligence-based moving object location measurement system according to a first embodiment of the present invention.

Hereinafter, embodiments according to the present invention will be described in detail with reference to the accompanying drawings.

Detailed descriptions of the present invention will be made with reference to the accompanying drawings illustrating specific embodiments of the present invention as examples. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or an arrangement of each component in each disclosed embodiment may be changed without departing from the scope and spirit of the present invention. Accordingly, there is no intent to limit the present invention to detailed descriptions to be described below. The scope of the present invention is defined by the appended claims and encompasses all equivalents that fall within the scope of the appended claims. Like numbers refer to the same or like functions throughout the description of the figures.

Hereinafter, in order for those skilled in the art to easily perform the present invention, exemplary embodiments of the present invention will be described in detail with reference to the accompanying drawings.

In the description below, a flow-charted technique or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be per-formed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, device, or apparatus. Further, unless expressly stated to the contrary, "or" refers to an inclusive-or and not to an exclusive-or. For example, a condition A or B is satisfied by any one of the following: A is true (or present) and Bis false (or not present), A is false (or not present) and B is true (or present), and both A and Bare true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

In one aspect, the system includes an artificial intelligent (AI) logic accessible to the first processor and configured with logic to identify one or more users recorded within a video frame captured by the first camera and/or the second camera.

Also used within the description are uses of Artificial Intelligence (AI) or AI Logic, Machine Learning, and Neural Networks. AI or AI Logic includes a several categories of techniques that allow computers to mimic human capabilities. AI techniques or logic include Machine Learning, Speech and Language Processing, Expert Systems, and Robotics. Machine Learning is the subset of AI that enables computers to improve at tasks through experience. Machine Learning includes traditional statistics-based approaches such as Regression Analysis and newer techniques like Deep Learning. Deep Learning uses large amounts of historical data to train multilevel Neural Networks to draw conclusions about new data. Throughout the specification, the description uses AI logic that deploys Deep Learning, in the form of Neural Networks, to identify classes of objects, object locations in video images and segments. Deep Learning is also used to identify distinctive activities or sub activities within the video images and segments. In some forms, Statistics-based machine learning is used to characterize the motion or direction of objects within the video images and segments.

Example aspects of an autonomous recording and processing system will now be more fully described. Each of these example aspects are provided so that this disclosure is thorough and fully conveys the scope of the inventive concepts, features and advantages to those skilled in the art. To this end, numerous specific details are set forth such as examples of specific components and methods associated with the system to provide a thorough understanding of each of the aspects associated with the present disclosure. However, as will be apparent to those skilled in the art, not all specific details described herein need to be employed, the example aspects may be embodied in many different forms, and thus should not be construed or interpreted to limit the scope of the disclosure.

Various aspects of the disclosure may refer generically to hardware, software, modules, or the like distributed across various systems. Various hardware and software may be used to facilitate the features and functionality described herein, including, but not limited to: an NVIDIA Jetson TX2 computer, having a 256-core NVIDIA Pascal GPU architecture with 256 NVIDIA CUDA cores, and a Dual-Core NVIDIA Denver 2 64-bit CPU and Quad-Core ARM Cortex-A57 MP Core, including 8 GB 128-bit LPDDR4 memory and 32 GB eMMC storage. Software may include: Linux operating system having Python programmed applications; Open CV image processing library; A WS Greengrass ML Model Development and Execution; video editing software using OpenCV image processing library and Python programming. Various cloud services and for storing and sending video may be used, including A WS S3 and A WS Glacier for video storage, and A WS CloudFront for content delivery and distribution. Cloud services for processing and editing video may include Python and OpenCV running on A WS EC2 servers. Cloud services for converting videos from one format to another may include AWS Elemental Media Convert. Cloud services and AI for generating a Neural Network may include A WS Sage-Maker for constructing, training, tuning, and evaluating machine learning models, including Keras/TensorFlow developmental framework, and Sage maker NEO to prepare models for deployment to local computers.

Cameras for use in the systems described herein may be HD cameras or 4K cameras.

A 4K camera may be manufactured by Hanwha, Model PNP-9200RH having specifications and operating manual herein incorporated by reference. Hanwha camera model PNO-9200RH is a 4K PTZ Camera including the following specifications:

A camera may be an HD camera capable of recording in High Definition. As such, a camera may be a Hanwha HD 1080p PTZ camera having a Model Number XNP-6321 H with specifications and operating manual herein incorporated by reference. Hanwha camera Model XNP-6321 has a HD 1080p PTZ Camera may be used.

An artificial intelligence-based moving object location measurement system according to the present invention may calculate a moving distance of a moving object from an image captured by a first camera and calculate location information and relative distance information of the moving object from an image captured by a second camera.

In this specification, an image mainly means a still image, but is not limited thereto and may be a video clip or 3D image. Therefore, images captured by a plurality of cameras including the first camera and the second camera may include a single still image captured at a specific point in time, a plurality of still images captured at a certain temporal gap during a specific period, or specific videos taken during the period.

A golf ball is assumed as a moving object according to an embodiment of the present invention. Accordingly, the artificial intelligence-based moving object position measurement system according to aspects of the present invention can be installed in a golf course, and measures the distance information between the golf ball and the hole as well as the location information of the golf ball hit by the player, the distance information between the golf balls between the players, and the like. Relative distance information related to the same golf ball can be provided to the player in real time.

FIG. 1 shows a schematic configuration of an artificial intelligence-based moving object location measurement system according to a first embodiment of the present invention.

Referring to FIG. 1, an artificial intelligence-based moving object positioning system according to a first embodiment of the present invention may include a first camera 10, a first laser rangefinder 12 provided in the first camera 10, and a second camera 20, a second laser rangefinder 22 provided in the second camera 20, an object monitoring device 30, a user terminal 40, and the like. The first camera 10 and the second camera 20 may have functions to take an 2D and/or an 3D image.

The first camera 10 and the second camera 20 may include not only a camera function for capturing images but also various functions such as motion recognition and image transmission according to an embodiment of specification of the present invention.

One or more first cameras 10 may be installed in a place where a user hits a golf ball with a golf club. As an example of such a place, the first camera 10 may be installed in a section where a tee shot is played, that is, a teeing ground. The first camera 10 may include hardware components such as a camera and a communication module.

The first camera 10 may capture a player's shot, i.e., a player hitting a tee shot at the teeing ground, and transmits the tee shot image, a first image, to the object monitoring device 30.

In one aspect, the object monitoring device(s) 30, 300 may include an AI logic, which includes logic capable of identifying one or more of: a golfer; a golf ball; a shirt; a shirt color; pants; a pants color; a skirt; a skirt color; a hat; a hat color; a golf glove; golf shoes; a golf cart; one or more persons in a golf cart; a golf tee; a golf club; an iron; a driver; a utility club; a putter; a wedge; a golf ball logo; a male; a female; a child; a junior; a shirt logo; a caddie; a marshal; a brand; a left handed golfer; a right handed golfer; a visor; glasses; sunglasses; a beverage; a tee box; a color of a tee box; trees; a fairway; a cart path; a green; a pin; a hole; a sand bunker; a water hazard; a grass hazard; woods; out-of-bounds; rough; a first cut of a green; a second cut of a green; birds; bugs; animals; a distance from tee to pin; a distance from tee to front of green; a distance from tee to center of green; a distance from tee to back of green; red stakes; white stakes; yellow stakes; change in elevation; clouds; rain; snow; fog; mist; mud; wind; topology of green; or cut of hole. However, it is not limited thereto.

In one aspect, AI logic may further include logic capable of identifying an activity including one or more of: golf activity; football activity; soccer activity; lacrosse activity; baseball activity; basketball activity; tennis activity; pickleball activity; beanbag toss activity; bowling activity; billiards activity; swimming activity; diving activity; racing activity; hockey activity; field hockey activity; disc golf activity; rugby activity; skiing activity; snowboarding activity; biking activity; fishing activity; boating activity; and sports activity.

In one aspect, the remote video processing system further includes: a remote video processing and management system in communication with the first processor, the remote video processing and management system configured to receive a first series of recorded videos and process the first series of record ed videos to create the AI logic. The processing of the first series of recorded videos includes tagging one or more uniquely identified objects within one or more frames of each of the recorded videos, the tagging including tags for identifying users and user activities within the video recorder. The shot recognition device may include a microphone, a motion sensor, a signal receiving module, and the like.

The processing further includes creating the AI logic including a neural network of tagged objects and distributing the AI logic to the first processor for use in processing video at the predetermined location. The processing further includes receiving the formatted video from the communication module and modifying the formatted video based on use of the mobile app.

In one aspect, the processor is configured to identify a second user recorded within the video frame captured by the first camera. The processor is configured to extract video frames from the first video, the video frames including the second user. The processor is configured to combine the extracted video frames into a second formatted video, the second formatted video including the second user.

The communication module communicates the second formatted video to the remote video processing system configured to further process the video and enable access to a mobile app of the identified second user.

In another aspect, the method includes, in response to detecting the object at the grid location, automatically adding a graphic associated with the location to the first processed recording.

In another aspect, an identity of the first player is determined via image recognition by the AI logic.

In another aspect, the method includes communicating, by the processor to a mobile device associated with the first player, a signal instructing the player to perform.

In another aspect, the method includes automatically transmitting the first processed recording to the first user.

Various functionalities of the objection monitoring device (s) 30, 300 described herein may be accomplished with the use of a computer, including processor and non-transitory computer readable medium or memory, with instructions stored thereon to be executed by processor. the object monitoring device 30, 300 may function automatically according to rules set forth in various algorithms. It will be further appreciated that the various processors, memory, and instructions may be distributed among various systems and via the cloud, and that some instructions or processing may occur remotely and be communicated between systems or modules. According to an aspect, the object monitoring device(s) may communicate with a first camera, a second camera, a third camera (not shown) or various combinations of additional cameras illustrated generally as Nth camera (not shown). The object monitoring device 30, 300 also may include a network module (not shown) connecting one or more cameras. The object monitoring device(s) 30, 300 may include non-transitory memory (not shown) connected to AI enabled processor (not shown). The first camera and the second camera may be operatively connected to and can be controlled by AI enabled object monitoring devices 30, 300. In other forms, a first and a second cameras 10, 20 can work independently with on-board capabilities for recording video as described herein.

AI enabled object monitoring devices 30, 300 can also include a modem (not shown), such as a cellular modem or hardwired modem, configured to communicate or transmit data via a network such as Internet/Cloud. Modem can be a cellular modem capable of communicating using a 3G, 4G, 5G, or other communication standard. In other forms, modem can be a wired modem capable of communicating using a broadband connection such as Ethernet or via a Fiber Optic connection, or various.

The first camera 10 may always capture an image, capture an image for a certain period of time when a player's motion is captured using a motion sensor, capture an image after the point at which the sound of a golf club colliding with a golf ball is input from a microphone, or capture an image when a specific signal sent by a player is received through the signal receiving module. The first camera 10 may transmit images captured in various ways to the object monitoring device 30.

In one aspect, the creating an AI logic further include the steps of: identifying a golfer holding a golf club within a previously recorded video; tagging the golfer having specific clothes, a golf club, and a golf ball; repeating the identifying and tagging steps over numerous previously recorded activities and image frames; generating the AI logic using the tagged images; and using the AI logic at a golf course having the first camera and the second camera.

The first laser rangefinder 12 can measure the distance from its position (reference position for distance measurement) to the golf ball. One or more first laser rangefinders 12 may be installed, and may be installed in the first camera 10 or in a location separate from the first camera 10.

In another aspect, the method may include identifying, at the AI processor, a first position of the first camera and a second position of the second camera.

When the first laser range finder 12 is installed in the first camera 10, since the first laser range finder 12 and the first camera 10 are at the same location, the distance between the first laser range finder 12 and the golf ball is the same as the distance between the first camera 10 and the golf ball.

If the laser rangefinder 12 is installed separately from the first camera 10, the distance between the laser rangefinder 12 and the golf ball is different between the first camera 10 and the golf ball.

For convenience of explanation, the first laser rangefinder 12 and the second laser finder 22 are installed in the first camera 10 and the second camera 20, respectively.

One or more second cameras 20 may also be installed at a place where a player hits a golf ball with a golf club, and such places include a fairway or around a green. The second camera 20 may be installed at a predetermined distance from the first camera 10. The second camera 20 is composed of hardware components such as a PTZ camera and a communication module. In addition, a second laser range finder 22 is installed in the second camera 20.

The second camera 20 may capture images of each part, for example, fairway, rough, green, bunker, etc., of the golf course. The second camera 20 may operate under the control of the object monitoring device 30 and capture a second image, i.e., the surroundings of the moving player, the location where the golf ball fell, and the area around the hole on the green, and transmit the captured second image transmitted to the object monitoring device 30.

The object monitoring device 30 may deliver various types of information to players in various ways.

As a first example, the object monitoring device 30 may track the moving trajectory of the golf ball from the image received from the first camera 10 and obtain the distance and direction the golf ball has moved based on the moving trajectory.

The object monitoring device 30 may identify and operate the second camera 20 around the location where the golf ball moved based on the moving distance, i.e., flying distance of the golf ball. That is, the object monitoring device 30 may specify the second camera 20 at a position closest to the golf ball or best visible to the golf ball, for example, capable of recognizing the largest portion of the golf ball.

The object monitoring device 30 may analyze the image received from the second camera 20 using an artificial intelligence-based model to detect objects such as golf balls and holes in the received image.

When an image including a golf ball or hole is confirmed, the object monitoring device 30 may control the operation of the second camera 20 so that the golf ball or hole is located in the center of the preview screen of the second camera 20. The second camera 20 is PTZ moved and zoomed in. Then, the object monitoring device 30 may operate the laser rangefinder 22 to measure the distance of the golf ball or the distance of the hole, and then receive the distance information from the second camera 20.

The object monitoring device 30 may calculate the position of the golf ball, the position of the hole, and relative distance information using the distance from the position of the second camera 20 to the golf ball and the distance to the hole. Here, the relative distance information may mean a distance between a golf ball and another golf ball, a distance between a golf ball and a hole, and the like.

As a second example according to an embodiment of the present invention, the object monitoring device 30 may track the movement trajectory of the golf ball from the image received from the first camera 10 and obtain a location where the golf ball has moved based on the movement trajectory. The object monitoring device 30 may identify and operate the second camera 20 around the golf ball based on the moving position of the golf ball. Thereafter, the object monitoring device 30 may perform the same operation as the operation described above in the first example.

The user terminal 40 according to an embodiment of the present invention may be a smartphone, a tablet PC, a smart watch, or the like carried by each player, and may be a dedicated terminal provided by a golf course. The dedicated terminal may be embedded in a cart of a golf course or provided in an attachable/detachable form.

According to an embodiment of the present invention, a first camera 10, a second camera 20, a first laser rangefinder 12, a second laser rangefinder 22, and an object monitoring device 30 may be AI enabled devices.

Figure 2:
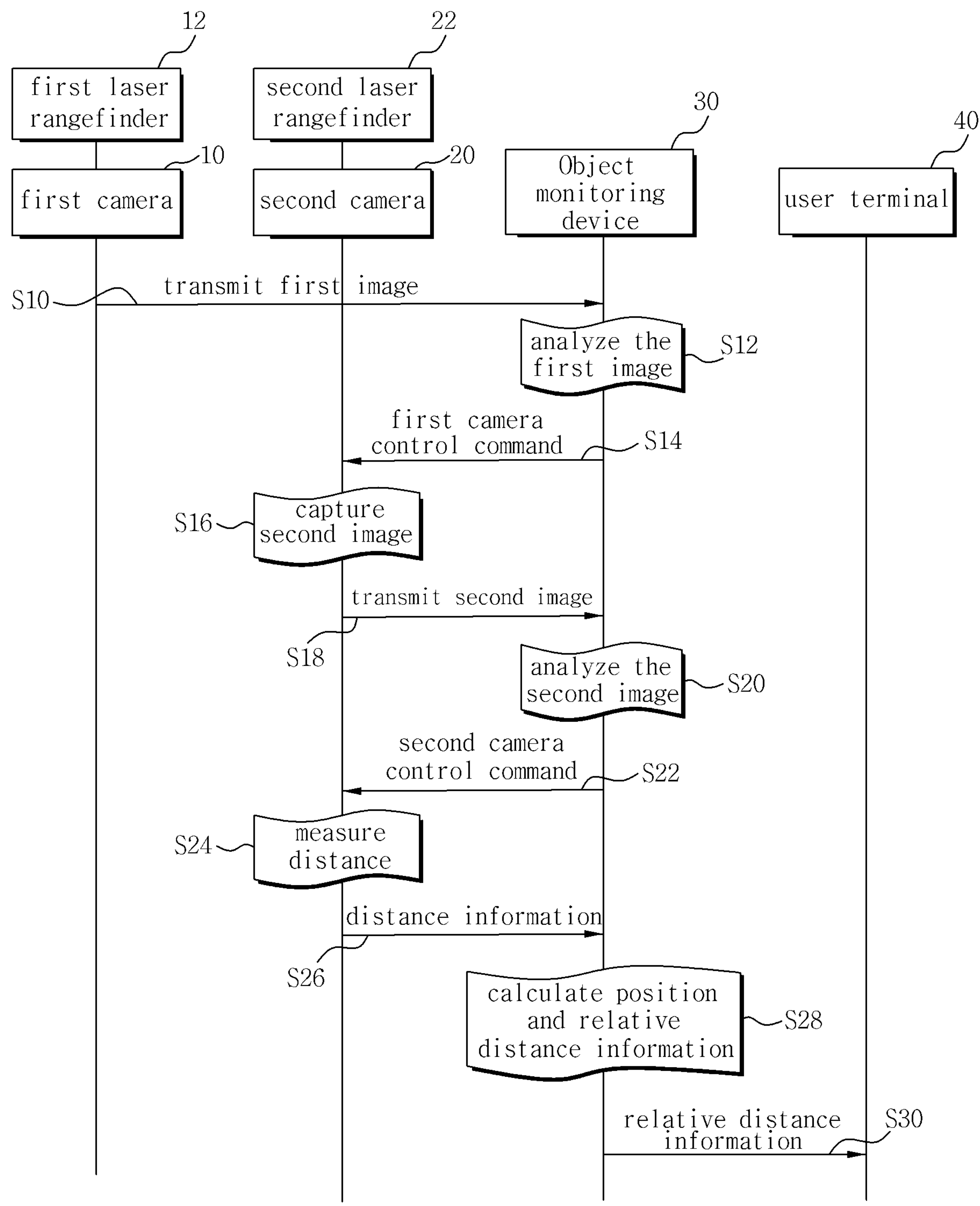
FIG. 2 is a signal flow diagram between each component in an artificial intelligence-based moving object location measurement system according to a first embodiment of the present invention.

FIG. 2 shows a signal flow between each component in a position measurement system of an artificial intelligence-based moving object according to a first embodiment of the present invention.

Referring to FIG. 2, the first camera 10 may transmit a first image such as a user's shot and, for example, an image (tee shot image) of a player playing a tee shot on a teeing ground, to the object monitoring device 30 through a wired/wireless communication network S10. The first camera 10 is in a standby state and starts capturing an image when a tee shot of the player is detected.

The object monitoring device 30 may analyze the first image received from the first camera 10 to generate distance information of the golf ball S12.

The object monitoring device 30 may track the moving trajectory of the golf ball from the first image using software for calculating the golf ball carrying distance, and calculates the moving distance, i.e., a carrying distance, of the golf ball based on the moving trajectory of the golf ball.

The object monitoring device 30 may designate the second camera 20 located closest to the golf ball or at the position where the golf ball is best seen as around the location where the golf ball fell based on the moving distance information of the golf ball, and the second camera 20 may transmit a camera control command, the first control command, for controlling the operation to the second camera 20 S14.

The second camera 20 may capture a surrounding image, that is, a second image while operating according to the camera control command of the object monitoring device 30 S16.

The second camera 20 may be in a photographing standby state, may start capturing by a camera control command, and continuously generate and transmit second images to the object monitoring device 30 S18.

The object monitoring device 30 may analyze the second image received from the second camera 20 and detect an object such as a golf ball, a hole, and a player in the second image S20. The object monitoring device 30 may recognize a specific object such as a golf ball or a hole from the second image using an artificial intelligence model.

When a golf ball or a hole is detected in the second image, the object monitoring device 30 may transmit a camera control command, i.e., a second control command, to the second camera 20 S22.

The second camera 20 may perform PTZ movement and zoom-in operation under the control of the object monitoring device 30 to position a golf ball or a hole in the center of the preview screen. In this case, the second camera 20 and the second laser rangefinder 22 may be positioned in parallel, and the distance between the second camera 20 and the golf ball or the distance between the second camera 20 and the hole may be measured through the second laser rangefinder 22 S24.

When distance information of the golf ball and the hole, i.e., a distance between the second camera and the golf ball and a distance between the second camera and the hole, is generated through the second laser range finder 22, the second camera 20 transmits the distance information of the golf ball to the object monitoring device 30 S26.

The object monitoring device 30 may calculate the position of the golf ball, the position of the hole, and the relative distance information of the golf ball using the distance information of the golf ball and the hole S28. That is, the object monitoring device 30 may calculate the position of the golf ball and the hole using the distance between the second camera 20 and the golf ball or the distance between the second camera 20 and the hole, and calculate real-time information used for the golf player such as the distance between the golf ball and other golf balls, the distance between the golf ball and the hole, and the like.

The object monitoring device 30 may transmit the calculated relative distance information to the player's user terminal 40 S30.

Figure 3:
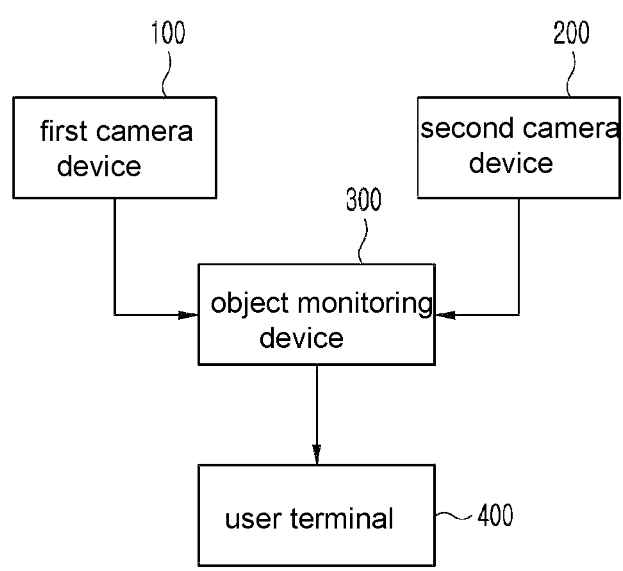
FIG. 3 is a schematic configuration diagram of an artificial intelligence-based moving object location measurement system according to a second embodiment of the present invention.

FIG. 3 shows a schematic configuration of a position measurement system of an artificial intelligence-based moving object according to a second embodiment of the present invention.

Referring to FIG. 3, the position measurement system of an artificial intelligence-based moving object according to a second embodiment of the present invention may include a first camera device 100, a second camera device 200, an object monitoring device 300, a user terminal 400, and the like.

The first camera device 100 may be installed at a specific place of a golf course, for example, a tee shot hit section, that is, a teeing ground. The first camera device 100 includes hardware components such as a camera, a communication module, a laser rangefinder, and software for calculating golf ball distance.

The first camera device 100 may capture image of the player hitting the tee shot on the teeing ground. The first camera device 100 may track the movement trajectory of the golf ball from the tee shot image and obtain the distance, i.e. a carrying distance, traveled by the golf ball based on the movement trajectory.

The first camera device 100 may transmit the distance traveled by the golf ball to the object monitoring device 300. When calculates the travel distance of the golf ball from the tee shot image, the first camera device 100 may randomly generate identification information of the player and include the identification information of the player in the travel distance information of the golf ball. The first camera device 100 may transmit the travel distance information of the golf ball including the player's identification information to the object monitoring device 300.

The second camera device 200 may be installed in a particular place of the golf course, for example, around a fairway or a green. The second camera device 200 includes hardware parts such as a PTZ camera, a communication module, and a laser rangefinder, and an artificial intelligence model for recognizing golf balls and holes in the image.

The second camera device 200 photographs a scene of each part (fairway, rough, green, bunker, etc.) of the golf course. The second camera device 200 may capture, i.e., photograph the area around the location where the golf ball fell and the area around the hole position on the green.

When the second camera device 200 may recognize the golf ball from the image taken using the artificial intelligence model, the PTZ camera is moved and zoomed in so that the golf ball is placed in the center of the screen, and then measures the distance of the golf ball using a laser rangefinder. A distance of the golf ball refers to the distance from the location where the second camera device 200 is installed to the position where the golf ball fell.

The second camera device 200 may measure distance of each golf ball by separating a plurality of golf balls based on the identification information of the player included in the travel distance information of the golf ball. That is, when four people play golf as a team, the second camera device 200 may measure the distance of the four golf balls by identifying each golf ball hit by the four players.

In addition, when the second camera device 200 recognizes a hole from an image recorded using an artificial intelligence model, it moves and zooms in the PTZ camera so that the hole is located in the center of the screen, and then measures the distance of the hole using a laser rangefinder. The distance of the hall refers to the distance from the location where the second camera device 200 is installed to the hall.

The second camera device 200 may transmit the distance of the golf ball and the distance of the hole to the object monitoring device 300.

When the object monitoring device 300 receives the movement distance information of the golf ball from the first camera device 100, the second camera device 200 near the golf ball fell based on the movement distance information of the golf ball It drives the operation to photograph the area around the location where the golf ball has fallen.

When the object monitoring device 300 receives information on the moving distance of the golf ball from the first camera device 100, based on the information on the moving distance of the golf ball, the object monitoring device 300 may drive the operation of the second camera device 200 around the location where the golf ball landed, the second camera device 200 may operate for capturing an image the vicinity of the golf ball landing position.

Since the second camera device 200 may be installed in multiple locations of the golf course, the object monitoring device 300 may select and operate the second camera device 200 that is closest to the golf ball at the location where it has landed.

The object monitoring device 300 may receive the distance information of the golf ball and the distance of the hole from the second camera device 200, and calculates the position of the golf ball and the hole and the distance between the golf ball and the hole using the distance of the golf ball and the hole. In addition, the object monitoring device 300 may calculate the position of another player's golf ball and the distance of the golf ball between players using the distance information of a plurality of golf balls.

The object monitoring device 300 may transmit the location of the golf ball, the position of the hole, the distance information between the golf ball and the hole, and the distance information of the golf ball between players to the user terminal 400.

The user terminal 400 may receive various information related to the position of the golf ball from the object monitoring device 300 and display it to the player. The user terminal 400 may visually output the position of the player's golf ball, the position of the hole, the distance information between the golf ball and the hole, and the distance information of the golf ball between the players along with the current hole on the screen of the user terminal 400.

Figure 4:
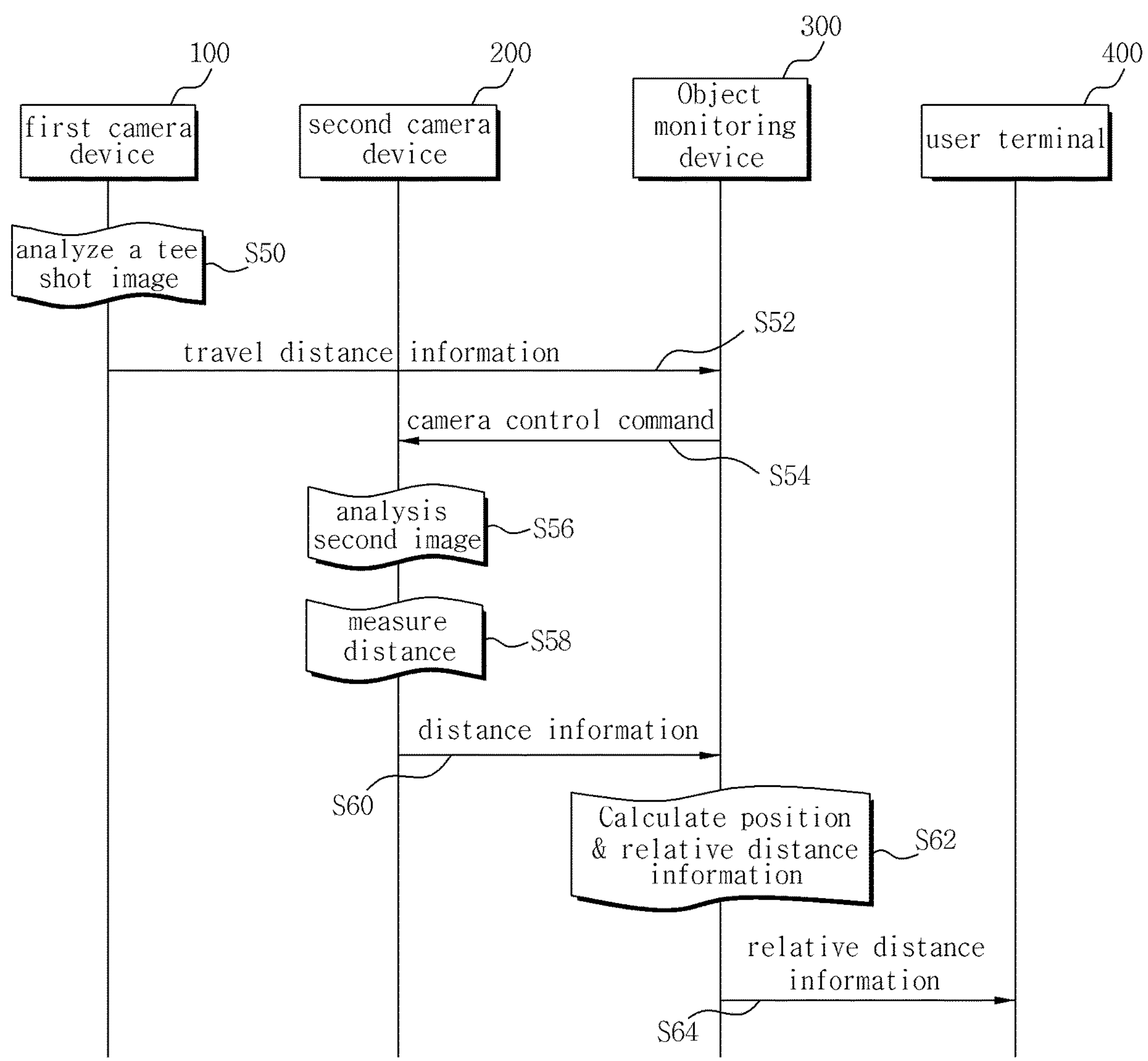
FIG. 4 is a signal flow diagram between components in an artificial intelligence-based moving object positioning system according to a second embodiment of the present invention.

FIG. 4 shows a signal flow between each component in an artificial intelligence-based moving object position measurement system according to a second embodiment of the present invention.

Referring to FIG. 4, the first camera device 100 may capture an image of a player hitting a tee shot on the teeing ground and analyze a tee shot image, that is, a first image S50. The first camera 10 may track the movement trajectory of the golf ball from the first image, calculate a distance, carrying distance, traveled by the golf ball based on the moving trajectory, and transmit the distance information, i.e., golf ball travel distance information, to the object monitoring device 300 S52.

When the object monitoring device 300 receives the distance information of the golf ball from the first camera device 100, the camera control command is transmitted to the second camera device 200 near the location where the golf ball landed based on the distance information of the golf ball S54.

The second camera device 200 may be driven according to a camera control command and continuously generates a second image by photographing the area around the golf ball landed and the hole position on the green, and perform analysis on the second image through an artificial intelligence model S56.

When the second camera device 200 recognizes a golf ball or a hole from the second image, moves and zooms in the PTZ camera so that the golf ball or hole is located in the center of the screen, and then measures the distance of the golf ball or the distance of the hole using a laser rangefinder S58.

The second camera device 200 may transmit distance information of the golf ball and distance information of the hole to the object monitoring device 300 S60.

The object monitoring device 300 may receive the distance information of the golf ball and the distance of the hole from the second camera device 200, and calculate the position of the golf ball and the hole and the relative distance information for the golf ball using the distance of the golf ball and the distance of the hole S62. That is, the object monitoring device 300 may calculate the distance between the golf ball and the hole, the distance between the golf ball and the hole, the distance of the golf ball between players, and the like.

The object monitoring device 300 may transmit the location of the golf ball and the hole, the distance information between the golf ball and the hole, and the distance information of the golf ball between the players, i.e., relative distance information to the user terminal 40 S64.

Figure 5:
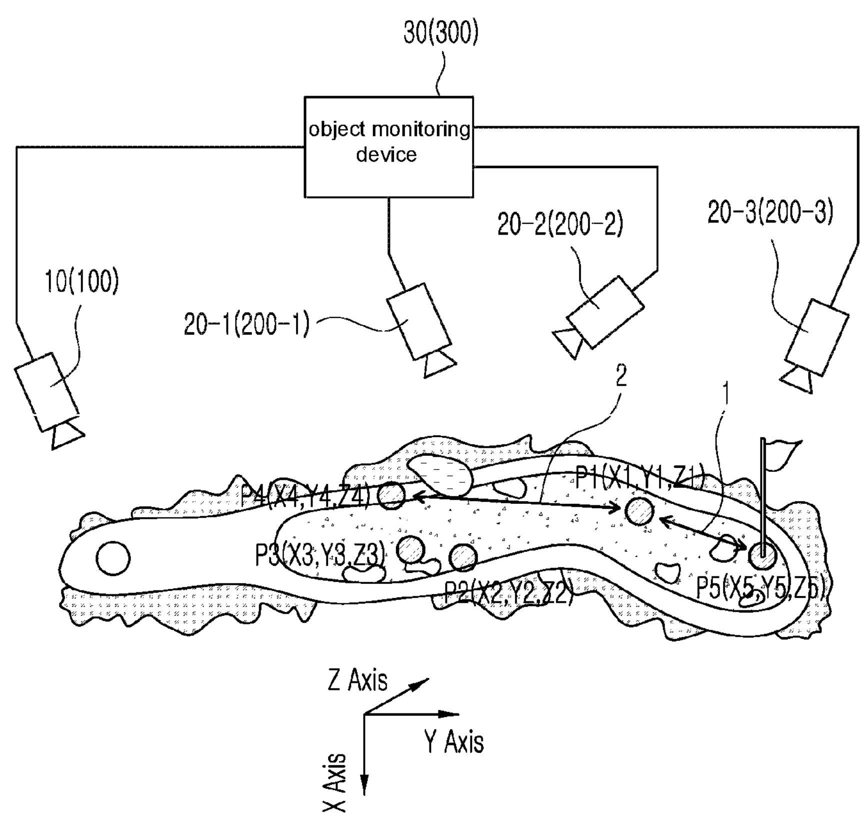
FIG. 5 is a view showing how the artificial intelligence-based moving object location measurement system according to the present invention is implemented in a golf course.

FIG. 5 shows a position measurement system of an artificial intelligence-based moving object according to an embodiment of the present invention implemented in a golf course.

Referring to FIG. 5, a first camera 10 or a first camera device 100 is installed in a teeing ground, i.e., a teeing ground, and a plurality of second cameras 20 or a second camera device 200 may be installed around the fairway or green.

The object monitoring devices 30 and 300 communicate with the first camera 10 or the first camera device 100 and the plurality of second cameras 20 or the second camera device 200 while communicating with the golf ball position P1, P2, P3, P4, the position of the hole P5, the distance between the golf ball and the hole 1, and the distance of the golf space 2 and transmit them to the user terminals 40 and 400.

Figure 6:
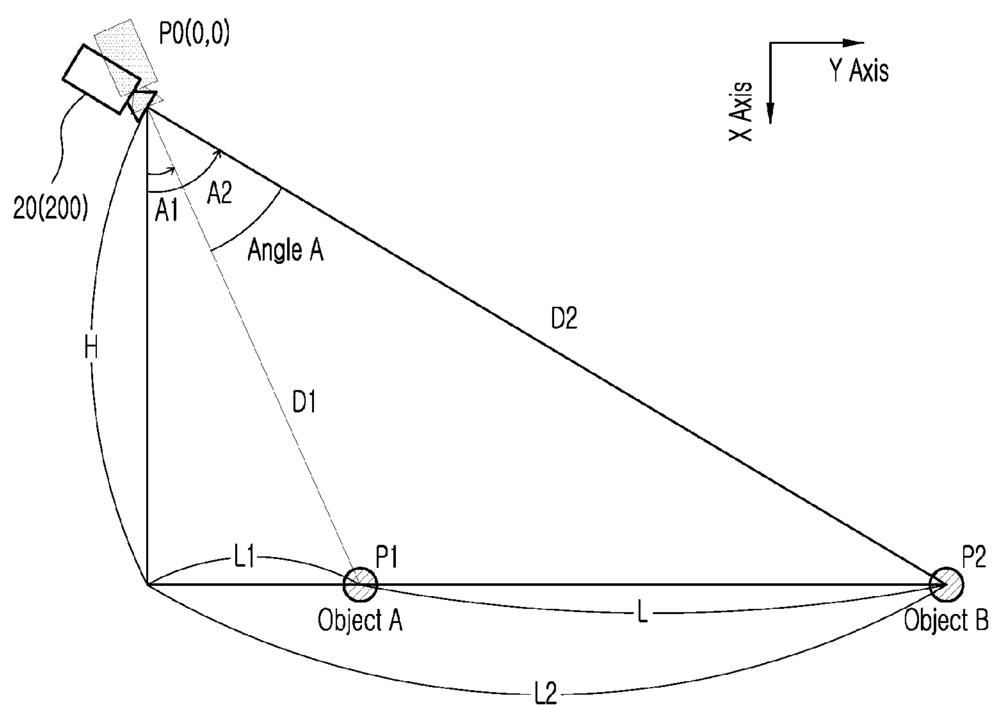
FIG. 6 is a diagram illustrating a process of obtaining a location and a relative distance of a moving object according to the present invention.

FIG. 6 illustrates the process of obtaining the position and relative distance of a moving object according to the present invention.

Referring to FIG. 6, when the position where the second camera 20 or the second camera device 200 is installed is P0 (0,0), the position of object A is P1, and the position of object B is P2, P0 to P1, that is, the distance from the second camera 20 to object A is D1, and the distance from P0 to P2, that is, the distance from the second camera 20 to object B is D2.

When measuring the distance D1 from the second camera 20 to object A, an angle of the camera is AI, and when measuring the distance D2 from the second camera 20 to object B, the camera angle is A2.

As described above, the distance from P0 to P1 and the distance from P0 to P2 can be measured using a second laser rangefinder 2. At this time, the angle A between D1 and D2 can be easily obtained from the camera's angle of movement, that is, A2-A1.

Since the camera position P0 and 0, the camera angle AI and the distance D1 are known, the position P1 value of object A can be calculated as follows.

$$(H, L1)=(D1\times\cos A1, D1\times\sin A1)$$

Similarly, since the camera position P0 (0, 0), the camera angle A2 and the distance D2 are known, the position P2 value of object B can be calculated as follows.

$$(H, L2)=(D2\times\cos A2, D2\times\sin A2)$$

Here, for convenience of explanation, the height H is the same, but the actual may be different. The distance L between P1 and P2, that is, the distance between object A and object B, can be calculated by Equation 1 or Equation 2.

$$L=\sqrt{D1^2+D2^2-2D1\cdot D2\cos A} \quad \text{[Equation 1]}$$

$$L=\sqrt{(D2\cos A2-D1\cos A1)^2-(D2\sin A2-D1\sin A1)^2} \quad \text{[Equation 2]}$$

Figure 7:
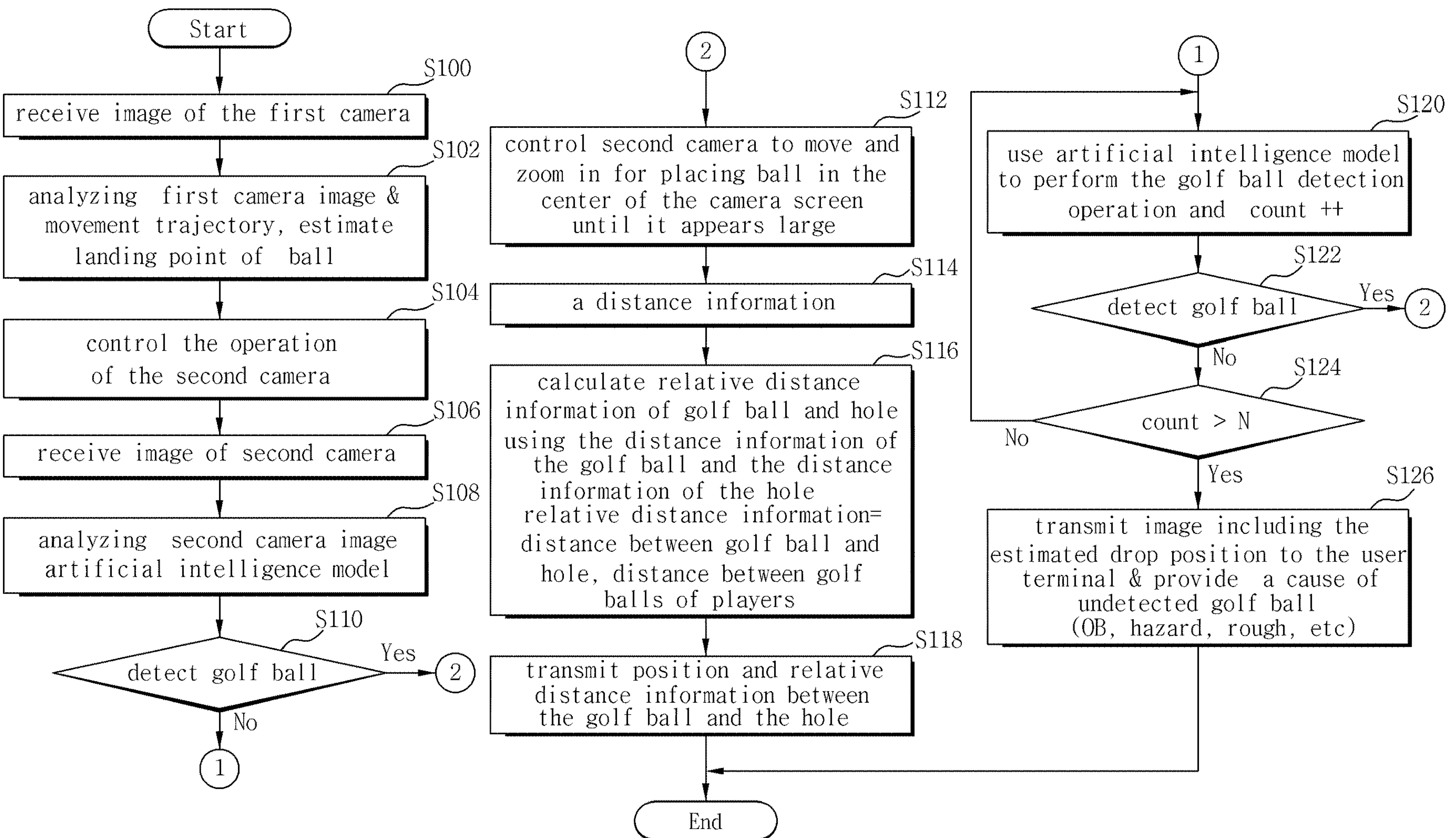
FIG. 7 is a flowchart illustrating a process of a method for measuring a position of a moving object based on artificial intelligence according to the present invention.

FIG. 7 shows a processing process of a position measurement method of an artificial intelligence-based moving object according to an embodiment of the present invention.

For convenience of description of FIG. 7, the first camera 10 or the first camera device 100 will be collectively referred to as the first camera, and the plurality of second cameras 20 or the second camera device 200 will be collectively referred to as the second camera.

In addition, the subject performing each step of FIG. 7 is an artificial intelligence-based moving object positioning system, specifically, the processor or software of the first camera, the processor or software of the second camera, and the processor or software of the object monitoring device are operated by AI enabled processor.

For convenience of explanation, it is described that the processor or software included in the artificial intelligence-based moving object positioning system performs the corresponding step for the processor or software of each of the first camera, the second camera, a first laser rangefinder, a second laser rangefinder, and the object monitoring device.

Referring to FIG. 7, when receiving an image taken by the first camera S100, the movement trajectory of the golf ball (the first object) is tracked by analyzing the first camera image, and the travel distance, i.e., a flight distance, of the golf ball is calculated based on the movement trajectory of the golf ball to estimate a landing point of the golf ball S102.

After estimating the landing point of the golf ball based on the travel distance of the golf ball, the second camera installed around the landing point of golf ball is specified to control the operation of the second camera S104.

When the operation of the second camera is controlled and the image taken by the second camera is received S106, the second camera image is analyzed using an artificial intelligence model S108.

Checking whether a golf ball is detected as a result of analysis of the second camera image S110.

If a golf ball is detected, while the operation of the second camera is controlled, the detected golf ball is placed in the center of the camera screen and zoomed in until it appears large S112.

When the second camera moves and zooms in and the golf ball is positioned in the center of the camera screen, the laser rangefinder installed in the second camera may measure a distance between the golf ball and the second camera, and the object monitor device may receive a distance information (distance information of the golf ball) between the golf ball and the second camera by the laser rangefinder S114.

In addition, when the golf hole is detected in the second camera, the distance between the golf hole and the second camera is measured through the same operation, and distance information (distance information of the hole) between the hole and the second camera may be received.

Then, using the distance information of the golf ball and the distance information of the hole, the position of the golf ball, the position of the hole, and the relative distance information are calculated S116. Relative distance information may include the distance between the golf ball and the hole and the distance between the golf balls between players.

When the position of the golf ball, the position of the hole, or the relative distance information is calculated in this way, the position and relative distance information between the golf ball and the hole are transmitted to the user terminal S118. At this time, an image obtained by capturing the surrounding environment at the point where the golf ball landed may be transmitted to the user terminal together with information on the location of the golf ball and the hole and relative distance information.

The player can check a location of his golf ball, a location of the hole, a distance between his golf ball and the hole, and a distance between his golf ball and the other player's golf ball through the screen of the user's terminal, and prepare for the next play in advance.

If the golf ball is not detected, the artificial intelligence model is used to perform the golf ball detection operation again and count the performance count S120.

When a golf ball is detected as a result of performing the golf ball detection operation, steps S112 to S118 are performed, and if the golf ball is not detected again, the performance count is confirmed S124, and step S120 is repeated.

When the performance count exceeds a predetermined value, the step is terminated by transmitting an image including the estimated drop position to the user terminal without further performing the golf ball detection operation S126. When transmitting an image including an estimated drop position, a cause of undetected golf ball (OB, hazard, rough, etc.) may be provided.

The position measurement system of an artificial intelligence-based moving object (hereinafter collectively referred to as a "measurement system") according to the present invention uses a known technology such as machine learning and deep learning (hereinafter collectively referred to as "machine learning") and a known artificial intelligence software or artificial intelligence program (hereinafter collectively referred to as "artificial intelligence") to check the location or movement path of a golf ball or other object (for example, a user, a user's belongings, etc.).

For example, the measurement system can use known machine learning to learn the size, shape, position, direction, orientation, and arrangement of golf balls, and then check the location or movement path of golf balls, the location or movement path of users or users, and other objects.

In particular, the measurement system may identify the location of a golf ball, a user, or another object by various methods. For example, the measurement system can check the golf ball in a specific image taken by the camera, and can check the position of the golf ball by measuring the distance between a laser rangefinder, a camera, or another reference point and the golf ball using a laser rangefinder.

In addition, the measurement system can check the position of the golf ball by checking the distance or angle between one or more cameras or other reference points and the golf ball using the two-dimensional positions or three-dimensional positions of the golf ball in each image.

In addition, the measurement system can analyze a plurality of images including a moving golf ball to identify the movement path of the golf ball, and estimate the movement path of the golf ball based on this. Thereafter, the measurement system may check the position of the golf ball by estimating the drop point based on the movement path of the golf ball.

However, compared with machine learning or artificial intelligence for autonomous driving, facial recognition, etc., machine learning or artificial intelligence for golf ball recognition can be considered relatively simple. First of all, when it comes to golf balls, they always have the shape of a (almost perfect) sphere with a certain diameter. Therefore, no matter what position the golf ball is in or from what angle the golf ball is captured the golf ball included in the video captured by the camera will always have a circular shape.

In addition, the golf ball moves as the user hits the golf ball, but most of the golf courses, auxiliary facilities, and surrounding environments are stationary, i.e., stopped. Therefore, except for users moving along the course of the golf course and trees moving by the wind, etc., the object moving in the image taken by the camera is very likely to be a golf ball.

As a result, machine learning for golf ball recognition may require a relatively small number of images compared to machine learning for autonomous driving and facial recognition, and thus the time required for machine learning for golf ball recognition and CPU capacity required for machine learning may be reduced.

Using these characteristics, the measurement system can relatively easily identify a circular object moving in a video taken by the camera, or a circular object that did not exist in the previous image but appeared in the new image to easily check the position or movement path of the golf ball.

Even if a part of the golf ball is covered by the grasses and only a part of the rim of the golf ball is included in the image taken by the camera, the measurement system can estimate the rim of the entire golf ball using the rim of the golf ball that can be confirmed in the image. Therefore, the measurement system can easily check the position or movement path of the golf ball.

The measurement system may perform different machine learning based on the image taken by each camera. That is, the measurement system may confirm the position or movement path of the golf ball or the location or movement path of a user or other object based on one or more of each image taken by each camera.

For example, when a specific camera is installed at a specific location of a golf course (for example, a specific x, y, z coordinate) but is fixed so that it cannot rotate or move, the measurement system The image taken with maximum zoom in, the image taken with maximum zoom out, and a plurality of images taken with zoom in between.

For example, a specific camera is installed at a specific location on a golf course (for example, specific x, y, z coordinates) However, if it is fixedly installed so that it cannot rotate or move, the above measurement system can run machine learning based on images taken by the camera with maximum zoom in, images taken with maximum zoom out, and a number of images taken with zoom in between.

In contrast, if a specific camera is installed at a specific location on the golf course so that it can rotate or move to a certain degree, the measurement system can run machine learning using images taken by the camera with maximum zoom in, images taken with maximum zoom out, and a number of images taken with zoom in between.

On the other hand, if a specific camera is detachably or fixedly installed on a movable object such as a drone, golf cart, golf bag or user, it can be considered that the camera is not installed in a specific location on the golf course, but is installed to be movable inside, outside, on the golf course surface or in the air.

Therefore, the camera may take an image at any position or height, and as a result, the measurement system may use more images to execute machine learning, and as a result, machine learning may take longer or require more CPU capacity.

The measurement system can reduce the amount of data required for machine learning, reduce CPU capacity or CPU operation time, or improve the accuracy of machine learning by performing machine learning using golf course-specific techniques. As a result, the driving speed of artificial intelligence may be increased, or the accuracy of artificial intelligence may be increased.

For example, there are man-made structures or man-made objects in or around golf courses, such as buildings, benches, tee shot points, pegs on greens, flags, holes, power poles, transmission towers, lightning rods, etc. Since these artificial objects generally have characteristics that do not change in detailed characteristics such as position, size, shape, orientation, color, etc., they will be referred to as "fixed objects". For reference, natural environmental objects such as trees, rocks, hills, ponds, flower beds, lawns, etc. inside or around a golf course can also be considered as fixed objects.

Therefore, when the image taken by the camera includes a golf ball and one or more fixed objects, the measurement system checks the detailed characteristics and position of the fixed object included in the image, so that the position or movement path of the golf ball moving between or between fixed objects can be easily confirmed, or the location or movement path of the user or other object can be easily confirmed.

On the other hand, there are also objects in or around the golf course that move according to rain or wind, such as artificial objects that can rotate or move up, down, left and right, or move, branches, leaves, flowers, grass, bushes, etc. In particular, the detailed characteristics of branches, leaves, flowers, and bushes change as they grow naturally, as well as the detailed characteristics such as size, shape, shape, and color, as well as the detailed characteristics can change drastically depending on the artificial landscaping work. For example, a grass or grass that has grown steadily and has increased in length or height may decrease drastically after artificial maintenance. In this respect, the above-described object will be referred to as a "partially fixed object".

The measurement system can reduce the amount of data required for machine learning, reduce CPU capacity or CPU driving time, or improve the accuracy of machine learning by performing machine learning using a technique specialized for partially fixed objects. As a result, the driving speed of artificial intelligence may be increased, or the accuracy of artificial intelligence may be increased.

For example, the measurement system drives various cameras before the opening of the golf course every morning to photograph the interior or surroundings of the golf course, and then checks the detailed characteristics of natural environmental objects or partially fixed objects such as the length of the grass on that day, the flow of flowers, and the like. Therefore, if the grass was long until the previous day, but the grass was mowed the previous evening or early in the morning of the same day, the measurement system can update the detailed characteristics of the partially fixed object with the characteristics of the day.

Accordingly, when the image taken by the camera includes a golf ball and one or more partially fixed objects, the measurement system can more easily identify the partially fixed object included in the image using the updated detailed characteristics of the above. Alternatively, by checking the location of a partially fixed object, the measurement system can more easily check the location or movement path of a golf ball moving between fixed objects or partially fixed objects, the location or movement path of a user or other object.

The measurement system may develop a technique specialized for the partially fixed object through a method different from the above-described method.

The measurement system aims to check the location or movement path of golf balls located in or around the golf course, while natural environmental objects such as branches, leaves, flowers, bushes, grass, etc. in or around the golf course are of any kind, how many, how much they have grown, and what arrangement they are located in.

That is, the measurement system does not need to check detailed information about partially fixed objects such as natural environmental objects located in or around the golf course, so it is usually sufficient to check only the basic characteristics for such partially fixed objects. For example, even if the grass of the part where the golf ball flies and lands, the measurement system only checks the position or movement path of the golf ball or other object, and does not need to check the position or detailed characteristics of the other partially fixed object.

Considering this aspect, the measurement system may be located inside or around the golf course and may consider a partially fixed object corresponding to a natural environment as a kind of fixed object. For example, since a partially fixed object located in a specific part of the image taken by a specific camera is considered as a kind of fixed object, it is possible to avoid checking the detailed characteristics of the partially fixed object one by one. Therefore, even if there is a small movement of a partially fixed object such as the grass moving by the wind or a tree branch swaying in the rain and wind, the measurement system considers it to be a kind of fixed object, and through simple calculation, the location or movement path of the golf ball, user or other object moving between fixed objects can be checked more easily.

However, an important point when using this fixed objectification method is that when a specific object, such as a golf ball or a user, moves into or around a partially fixed object, the measurement system must confirm it clearly. Because when using the fixed objectification method of a partially fixed object, the measurement system may be difficult to check the position of a golf ball or the like located in or around a partially fixed object. Therefore, when using this method, the measurement system captures more images per unit time, captures images in a zoomed-in state, or uses other methods to move inside a partially fixed object It is necessary to more reliably and carefully check the golf ball located therein.

As described above, a partially fixed object has a characteristic that its detailed characteristics change over time, and this change is changed by natural phenomena such as sun, rain, wind, etc., or it was not in the manager's planned maintenance or maintenance or plan, but it can be changed by maintenance or maintenance due to urgent needs.

Therefore, when a change occurs in even a part of the detailed characteristics of the partially fixed object, the measurement system may update the three parts of the partially fixed object by the change after recognizing the change. Accordingly, the measurement system can more easily and accurately check the location or movement path of the golf ball, the location or movement path of the user or other object using machine learning or artificial intelligence.

The measurement system can update the properties of a partially fixed object at various points in time. For example, the measurement system may be used before the opening of the golf course every morning, before a particular user hits the golf ball on the first hole, or before a golf player hits the golf ball every hole. Alternatively, after the golf course manager executes maintenance work on the partially fixed object, the detailed characteristics of the specific partially fixed object may be updated according to a manager's control signal.

In contrast, the measurement system may automatically reflect the changes in machine learning or artificial intelligence by measuring weather or seasonal factors such as solar irradiation, rainfall, temperature, humidity, and wind direction, predicting the changes and updating the characteristics of the partially fixed objects at various times.

For example, based on the amount of solar irradiation, rainfall, temperature, humidity, etc. during a specific period, as well as the amount of fertilizer supplied by the management site, changes in the length and thickness of grass, flowers, grass, trees, etc. can be predicted in advance. However, since there are limitations in this estimation method, the image described above can be used together with the above estimation method.

In addition, even if it is a fixed object, the detailed characteristics may change due to the work of the manager in the future, the detailed characteristics may change due to a natural disaster, or the detailed characteristics may change as additional fixed objects are installed. Therefore, as with the partially fixed object described above, by updating the detailed characteristics of the fixed object when it changes, the measurement system uses machine learning or artificial intelligence to more easily and accurately check the location or movement path of the golf ball or the location or movement path of the user or other object.

An artificial intelligence-based moving object location measurement system may include a first camera 10, a first laser rangefinder 12, a second camera 20, a second laser rangefinder 22, an object monitoring device 30, a user terminal 40, and the like have been described above according to an embodiment of the present invention.

However, the position measurement system of the artificial intelligence-based moving object including the above-described first camera, the second camera, the laser rangefinders, the object monitoring device, and the user terminal may have a different configuration and may operate in a different way than described above.

The following will describe an example of a modification of the above-described embodiment of the present invention.

The measurement system may record an image using the first camera and the second camera, and analyze the image to check the previous position, current position, moving path, moving speed, and the like of a golf ball, a player or a specific object.

Accordingly, the camera used by the measurement system may photograph a still image or a moving image, and may photograph a black and white, color, 2D, or 3D image. In addition, a filter of a specific color may be used for the camera to more easily identify the golf ball in the captured image. In addition, the measurement system may analyze the image captured by the camera as it is, or may process and analyze it using a known method.

As described above, the camera used by the measurement system can capture still images or videos in the visible light band, but if necessary, it can capture images using electromagnetic waves with frequencies outside the visible light band. Therefore, the measurement system may use a camera to which an infrared sensor is attached in addition to a general camera.

The measurement system may include one or more transceivers, and the transceiver may be responsible for transmitting and receiving between a first camera, a second camera, laser rangefinders, and the like, an object monitoring device or a user terminal according to an embodiment of the present invention.

In addition, the first camera, the second camera, and the laser rangefinders may be manufactured to directly transmit and receive to and from an object monitoring device or a user terminal, respectively. That is, an image captured by each camera may be transmitted, a distance measured by a laser rangefinder may be transmitted, and a signal measured by other sensors may be transmitted. As described above, one or more transmitting and receiving devices in the measurement system may be installed in various components or various locations.

In addition, the transceiver of the measurement system may transmit and receive signals using various existing methods. The transceiver can adopt both wired and wireless transmission and reception methods, and in the case of wireless transmission and reception, not only broadband communication methods such as LTE, 3G, 4G, 5G, and 6G but also existing short-range communication methods such as UWB, Wi-Fi, ZigBee, and Bluetooth can be used.

The measurement system can check the location or movement path of a golf ball, a user, or a specific object using various configurations and methods, and for convenience of description, the measurement system determines the location or movement path Golf balls, users, or specific objects, etc. are hereinafter collectively referred to as targets.

The measurement system can use a variety of information to determine the target's location or path. Examples of this information may include (1) one or more cameras and one or more still images or videos taken by the camera, (2) the distance to the target (straight line distance), (3) the laser rangefinder measures the distance to the target and when the distance to other objects is measured, the difference between the distances, (4) the difference between the two or three-dimensional position (absolute) of a specific point, (5) the distance between a particular reference point and a target, and (6) a two-dimensional or three-dimensional angle between a particular reference point and a target.

In particular, the measurement system can directly obtain various information of (1) to (6) above using the image or sensor. Alternatively, the measurement system learns various information related to (1) to (6) videos, measurements, etc. through machine learning, and then uses artificial intelligence to obtain various information of (1) to (6) above.

However, examples of "two-dimensional or three-dimensional positions" above include (x, y) or (x, y, z) of the Cartesian coordinate system, and examples of "specific reference points" above include a specific fixed object, a specific part of a fixed object, a camera, a laser rangefinder, a point preset by a user or administrator even though a particular fixed object is not located. In addition, examples of "quadratic or three-dimensional angles" above are $(\alpha,\rho)$ or $(\alpha,\rho,\eta)$ of spherical coordinates.

Therefore, the measurement system can easily check the location or movement path of the target using one or more of the (1) to (6). For example, one of the various configurations and methods described above is a combination of (1), (2) and (4), which confirm the relative position of a target such as a golf ball with a specific reference point using an image, and use the distance measured by a laser rangefinder to confirm the absolute position of a target such as a golf ball.

Another example among the various configurations and methods described above is a configuration and method that uses only (1). That is, the measurement system installs three or more cameras at different positions or heights to obtain different images including targets such as golf balls, and then checks the location or movement path of golf balls and the like using conventional triangulation.

On the other hand, if a specific reference point is included in the image taken by the camera, the measurement system may check the location or movement path of a target such as a golf ball by triangulation using only two images.

In the configuration and method using only (1) above, the position or movement path of the target can be obtained using the laser rangefinder of (2). As described above, by using triangulation using two or more images and the laser rangefinder of (2), the measurement system can reduce errors that occur when estimating the location or path of the target by reconfirming the location or path of the target.

In general, the location of the target is determined by three variables in a particular sin system. Therefore, the measurement system uses two or three or more of (1) to (6) above to make three independent equations, and solving these equations can find the absolute three-dimensional position of the target. In addition, the measurement system can check the target's movement path, movement speed, and the like from the change of the position over time.

The measuring system may measure a distance to a target such as a golf ball, a user, or a specific object using an apparatus, a device, or method other than a laser rangefinder. For example, the measurement system may measure distance using infrared, ultraviolet, electromagnetic waves of other wavelengths, or ultrasound instead of a laser rangefinder.

According to an embodiment of the present invention, it has been described that the golf ball possible in the image photographed by the camera is located in the center of the image, but if necessary, the target such as a golf ball, a user, or a specific object need not necessarily be located in the center of the image. That is, as long as the measurement system can grasp characteristics such as the position, angle, and the like of the target from the image, the target may be located at any point in the image.

The measurement system can be mounted and used in various positions with a diverse number of cameras and laser rangefinders in various configurations.

For example, the camera and the laser rangefinder may be manufactured or installed together to be able to rotate "up or down or left and right" (hereinafter abbreviated as "up and down/left and right") or together "up or down or left and right or back and forth" (hereinafter abbreviated as "up and down/left and right"/back and forth). Therefore, in the case of this configuration, the distance between the camera and the golf ball can be said to be approximately equal to the distance between the laser meter and the golf ball.

In contrast, the camera and the laser rangefinder can be installed so that they can rotate up and down/left and right independently, or can move up/down/left and right/back and forth independently.

In addition, when the camera and the laser rangefinder rotate or move independently, the direction of rotation or movement of the camera, the angle of movement or the travel distance for photographing a particular golf ball may be different from the rotation or moving direction, the angle of movement or the distance traveled of the laser rangefinder, depending on the installation position of the camera and the laser rangefinder.

The above-described first camera, the second camera, the laser rangefinder, the object monitoring device, and the like may be installed to be fixed at a specific position. For example, a first camera, a second camera, a laser rangefinder, an object monitoring device, etc. may be installed to be fixed to a tree, a telephone pole, a lightning rod, a lighting furniture or other natural structure or other artificial structure in or around a golf course. Of course, the first camera, the second camera, or the laser rangefinder may be manufactured so that it can be rotated while fixed at the position.

Alternatively, one or more of the first camera, the second camera, the laser rangefinder, and the object monitoring device may be installed to be movable or to be constant in position but can be turned. For example, the camera may include a drive device and a motor capable of rotating or moving the camera to enable a change in direction, position, or height. In addition, the camera position or orientation can be manipulated by installing a rail on which the camera can move and moving or rotating the camera along the rail.

In addition, one or more of the first camera, the second camera, the laser rangefinder, and the object monitoring device are installed in a golf cart, robot or drone capable of moving, and by coordinating their movement, the first camera, the second camera, the laser rangefinder, and the object monitoring device can be operated.

In addition, the first camera, the second camera, the laser rangefinder, the object monitoring device, and the like may be installed to be fixed and the position can be constant. In contrast, the first camera, the second camera, the laser rangefinder, the object monitoring device, etc. are installed so that they can be removed, and the user can adjust the position or height later.

The laser rangefinder described above may be installed in various positions as long as the position of a golf ball, user or other object can be measured. For example, the laser rangefinder may be installed in the same position or height as or very close to the first camera or the second camera. For this purpose, the laser rangefinder and the first or second camera may be manufactured as a single body.

Alternatively, the laser rangefinder(s) may be installed at a different position or height than the first camera or the second camera. In this case, the measuring system can determine the position of the golf ball, the user, or a specific object in consideration of the position and height of the laser rangefinder(s) and the position and height of the first or second camera.

The measurement system may include one or more known sensors. For example, the measurement system includes a weathervane for measuring wind direction, an anemometer for measuring wind speed, a rainfall meter for measuring rainfall presence and rainfall, a thermometer for measuring temperature, a hygrometer for measuring humidity, a clock for measuring time, a timer for measuring the length of a specific period, a horse for measuring sound, and the like. The sensor(s) may be installed in the above-described a first camera, a second camera, a first laser rangefinder, a second rangefinder, an object monitoring device, or user terminal.

In addition to the location of golf balls and users, the measurement system may identify the location of various objects such as golf clubs, golf club cases, user supplies (for example, hats, clothes, etc.) and notify the user. In addition, the measurement system can analyze the image already taken at the user's request to determine the position of the object after the fact.

The above description is merely an illustrative description of the present invention, and various modifications will be possible by those skilled in the art to which the present invention belongs, to the extent that it does not depart from the technical spirit of the present invention.

Therefore, the embodiments disclosed in the present invention are not limited to the present invention. The scope of the present invention should be construed according to the following claims, and all techniques within the equivalent range should be construed as being included in the scope of the present invention.

It is to be understood that such embodiments are merely exemplary embodiments of the technical idea of the present invention, and that they are intended to cover various changes or modifications included within the spirit and scope of the invention.

| [Explanation of the symbols] | |
|---|---|
| 10: first camera | 20: second camera |
| 12: first laser rangefinder | 22: second laser rangefinder |
| 30, 300: Object monitoring device | 40: user terminal |
| 100: first camera device | 200: second camera device |

What is claimed is:

1. An artificial intelligence-based moving object positioning system, the system comprising:

a first camera configured to capture an image of a first object;

a second camera configured to install around the location where the first object moved and configured to capture images of the first object and the second object associated with the first object;

a rangefinder configured to measure a first distance between the first object and a distance measurement reference position and a second distance between the second object and the distance measurement reference position; and an object monitoring device configured to calculate a position value of the first object and a position value of the second object based upon the first distance and the second distance measured by the rangefinder, wherein the object monitoring device analyzes the image captured by the first camera to track a movement trajectory of the first object, calculates a distance traveled by the first object based on the movement trajectory of the first object, and designates the second camera, and controls an operation of the second camera, wherein the first object is a golf ball, wherein the range finder is a laser range finder.

2. The artificial intelligence-based moving object positioning system of claim 1, wherein the object monitoring device, when the first object is recognized, analyzes the image taken by the second camera and recognizes the first object, moves and zooms the second camera to position the first object at a specific point in the image, and receives a first distance between the first object measured from the rangefinder and the distance measurement reference position.

3. The artificial intelligence-based moving object positioning system of claim 2, wherein the object monitoring device is configured to move and zoom in the second camera to locate the second object at a specific point in the image, when analyzing the image captured by the second camera and recognizing a second object associated with the first object, and to calculate a position value of the first object and a position value of the second object using the first distance and the second distance after receiving the second distance between the second object and the distance measurement reference position measured the rangefinder.

4. The artificial intelligence-based moving object positioning system of claim 1, wherein the object monitoring device is configured to transmit an image including an estimated position moved by the first object to a user terminal based on a distance traveled by the first object if the image captured by the second camera is analyzed and the first object is not recognized by analyzing.

5. The artificial intelligence-based moving object positioning system of claim 1, wherein the object monitoring device is configured to transmit at least one of a distance between the first object and the second object calculated using a position value of the first object, a position value of the second object, a position value of the first object, and a position value of the second object.

6. The artificial intelligence-based moving object positioning system of claim 1, a first camera device that calculates the distance traveled by the first object by tracking the movement trajectory of the first object from the image acquired by photographing the first object;

a second camera device for measuring a first distance between the first object and a distance measurement reference position and a second distance between the second object and a distance measurement reference position by photographing the first object and a second object associated with the first object and the distance measurement reference position installed around the first object moved by the first object;

an object monitoring device for calculating a position value of the first object and a position value of the second object using the first distance and the second distance received from the second camera device.

7. The artificial intelligence-based moving object positioning system of claim 6, wherein the first camera device transmits the movement distance of the first object to the object monitoring device, wherein the object monitoring device designates the second camera device based on the movement distance of the first object to control the operation of the second camera device.

8. The artificial intelligence-based moving object positioning system of claim 7, wherein the second camera device recognizes the first object from the captured image, moves and zooms in the second camera to position the first object at a specific point in the image, and measures the first distance between the first object and the distance measurement reference position using the rangefinder, wherein the second camera device recognizes the second object from the captured image, moves and zooms in the second camera to position the second object at a specific point in the image, and measures the second distance between the second object and the distance measurement reference position using the rangefinder.

9. A method of measuring the position of a moving object in an AI-based moving object position measurement system, comprising:

analyzing the image taken by the first camera to track the movement trajectory of the first object, and calculating the travel distance of the first object based on the movement trajectory of the first object;

recognizing the first object by analyzing an image captured by a second camera installed around a location where the first object moved based on the movement distance of the first object;

moving and zooming in the second camera to position the first object at a specific point of the image, and receiving a first distance between the first object and a rangefinder measured from the rangefinder installed in or around the second camera;

analyzing an image captured by the second camera to recognize a second object associated with the first object;

moving and zooming in the second camera to position the second object at a specific point in the image, and receiving a second distance between the second object measured from the rangefinder; and calculating a position value of the first object and a position value of the second object using the first distance and the second distance, wherein the first object is a golf ball, wherein the range finder is a laser range finder.

* * * * *